United States Patent
Anderson et al.

(10) Patent No.: US 11,190,733 B1
(45) Date of Patent: Nov. 30, 2021

(54) SYSTEMS AND METHODS FOR APPLICATION OF CONTEXT-BASED POLICIES TO VIDEO COMMUNICATION CONTENT

(71) Applicant: Theta Lake, Inc., San Mateo, CA (US)

(72) Inventors: James E. Anderson, Ashburn, VA (US); Devin H. Redmond, Encinitas, CA (US); Richard B. Sutton, San Mateo, CA (US); Sharon Hüffner, Berlin (DE); Derek Brenner, Santa Barbara, CA (US)

(73) Assignee: Theta Lake, Inc., San Mateo, CA (US)

( * ) Notice: Subject to any disclaimer, the term of this patent is extended or adjusted under 35 U.S.C. 154(b) by 0 days.

(21) Appl. No.: 15/916,946

(22) Filed: Mar. 9, 2018

Related U.S. Application Data (60) Provisional application No. 62/589,254, filed on Nov. 21, 2017, provisional application No. 62/578,070, filed on Oct. 27, 2017.

(51) Int. Cl.
*H04N 7/15* (2006.01)
*H04L 29/06* (2006.01)
*G06K 9/00* (2006.01)

(52) U.S. Cl.
CPC ......... *H04N 7/155* (2013.01); *G06K 9/00718* (2013.01); *H04L 65/403* (2013.01); *G06K 2209/27* (2013.01)

(58) Field of Classification Search
CPC .. H04L 65/403; H04N 7/155; G06K 9/00718; G06K 2209/27
See application file for complete search history.

(56) References Cited

U.S. PATENT DOCUMENTS

| | | | |
|---|---|---|---|
| 7,757,171 B1 * | 7/2010 | Wong | G11B 27/105 715/719 |
| 8,078,603 B1 * | 12/2011 | Chandratillake | G06F 16/74 707/706 |
| 8,620,136 B1 * | 12/2013 | Malegaonkar | H04N 21/252 386/239 |
| 9,992,330 B1 * | 6/2018 | Hodge | H04M 3/42068 |

(Continued)

OTHER PUBLICATIONS

U.S. Appl. No. 16/676,891, filed Nov. 7, 2019, Systems and Methods for Identifying Participants in Multimedia Data Streams, James E. Anderson.

(Continued)

*Primary Examiner* — Andrew C Georgandellis
(74) *Attorney, Agent, or Firm* — Goodwin Procter LLP (57) ABSTRACT

The disclosed invention provides methods supporting systems that processes video communication(s) provided by an organization subject to internal or external regulations such as a specific financial services firm or a specific consumer product goods company. In various embodiments, video content is analyzed through a pipeline process of multiple extraction scripts, programs, and/or services and processes the content for participant likeness through facial recognition, voice recognition, and voice-to-text and stores the output in a normalized, searchable data store. A policy analysis is performed based on the stored data and external regulatory compliance, internal rules such as acceptable use policies, community-based regulations, or any combination thereof, to determine a risk score.

26 Claims, 9 Drawing Sheets

(56) References Cited

U.S. PATENT DOCUMENTS

| | | | |
|---|---|---|---|
| 2005/0053207 A1* | 3/2005 | Claudatos | H04M 3/42221 |
| | | | 379/88.22 |
| 2007/0198323 A1* | 8/2007 | Bourne | G06Q 10/00 |
| | | | 705/7.41 |
| 2007/0239457 A1* | 10/2007 | Sorvari | G10L 17/00 |
| | | | 704/270 |
| 2008/0228581 A1* | 9/2008 | Yonezaki | G06Q 30/0241 |
| | | | 705/14.4 |
| 2010/0063815 A1* | 3/2010 | Cloran | G06Q 10/10 |
| | | | 704/235 |
| 2014/0320497 A1 | 10/2014 | Vojnovic et al. | |
| 2015/0103131 A1* | 4/2015 | Denoue | H04N 7/147 |
| | | | 348/14.03 |
| 2015/0106629 A1* | 4/2015 | Anderson | H04L 12/2618 |
| | | | 713/189 |
| 2016/0378846 A1* | 12/2016 | Luse | G06F 17/30097 |
| | | | 707/740 |
| 2019/0215464 A1 | 7/2019 | Kumar et al. | |
| 2019/0379742 A1 | 12/2019 | Simpkinson et al. | |

OTHER PUBLICATIONS

U.S. Appl. No. 29/697,059, filed Jul. 3, 2019, Computer Display With Video Timeline Graphical User Interface, James E. Anderson.
U.S. Appl. No. 29/697,063, filed Jul. 3, 2019, Computer Display With Video Timeline Graphical User Interface, James E. Anderson.
U.S. Appl. No. 29/697,064, filed Jul. 3, 2019, Computer Display With Video Timeline Graphical User Interface, James E. Anderson.
U.S. Appl. No. 29/697,067, filed Jul. 3, 2019, Computer Display With Video Timeline Graphical User Interface, James E. Anderson.
U.S. Appl. No. 29/705,629, filed Sep. 13, 2019, Computer Display With Workflow Editor Graphical User Interface, James E. Anderson.

\* cited by examiner

SYSTEMS AND METHODS FOR APPLICATION OF CONTEXT-BASED POLICIES TO VIDEO COMMUNICATION CONTENT

CROSS REFERENCE TO RELATED APPLICATIONS

This application claims priority to U.S. Provisional Patent Application Ser. No. 62/578,070 filed on Oct. 27, 2017, and U.S. Provisional Patent Application Ser. No. 62/589,254 filed on Nov. 21, 2017, the entire disclosures of which are incorporated by reference herein.

FIELD OF THE INVENTION

The invention relates, generally, to processing and storing video communications, and, more specifically, to processing and storing video communications based on the application of policies based on the automated detection of content within the video communications.

BACKGROUND

"Video communication"—i.e. video conferencing initiated and/or video content created by an organization to communicate internally with employees and externally with prospective customers, customers, prospective partners, and other 3rd parties—is seen as the next stage of human telecommunication technology, as demonstrated by the adoption and growth of Internet-based video communication apps, products, and services, (such as Cisco WebEx, GoToMeeting, Microsoft Skype for Business, Microsoft Teams, Google Hangouts, Skype, CafeX, Apple FaceTime, Zoom, and BlueJeans) as well as video created for display using mediums and tools (including but not limited to Vidyard, Kaltura, Brightcove, Panopto, YouTube, Vimeo, Facebook, and more.) Organizations in all industries are increasing their use of video communication in an effort to improve communication with their external customers, clients, partners, and public, while at the same time are pressured by competitive forces and public demand to use modern, inexpensive, Internet packet-based methods of communication.

However, video communication is a challenge to any regulated industry or organization that must comply with industry regulations, corporate compliance policies (such as protection of intellectual property and risk to acceptable use policies), and protection of consumer privacy. Most organizations must meet some set of compliance objectives related to their industry and operational policies, for example: financial regulations (FINRA, FFIEC, FCA, ASIC, and IIROC), healthcare (HIPAA), government (FISMA), privacy (GDPR) corporate AUPs, trade secrets, etc. This set of compliance objectives often include burdensome reporting and archiving requirements, and policy violations may result in costly disciplinary actions such as sanctions or fines, or loss of reputation for the organization.

Video communication content—that is the audible and visible communication delivered by the participants within the teleconference—is very difficult to compare with rules and requirements of the initiating or creating organization as well as determine compliance with regulatory requirements that apply to the organization based on its industry objectives. Moreover, the content and context of meetings can change, so polices applied to a particular set of individuals or in a certain context may change as conversations evolve to new topics or involve additional information or the participants change. To date there are no automated, business-aware methods to apply context and content-aware policies to analyze video communication, including its participants in a manner that meets an organizations objectives.

Moreover, the need to archive, e.g., the long-duration electronic storage of digital recorded video files is very expensive because of the relative size of video recordings (often into gigabytes per video, and terabytes even petabytes in aggregate), comparative costs of electronic storage over long periods versus other media (e.g., electronic text documents, electronic audio recordings, etc.), the complexity of managing large libraries of digitally recorded video files, and rigid data integrity standards and access policies. Yet any particular segment of video must be available for auditor access on short notice.

What is needed are techniques and supporting systems that analyze the context and content of video communications and apply proper processing steps to the resulting data such that the organization meets its regulatory and operational guidelines.

SUMMARY OF THE INVENTION

Aspects of the invention provide techniques and supporting systems designed to address the need for automated application of regulatory policies against video communication as retained by an organization. In general, the invention compares content extracted from video communication to compliance objectives and applies one or more workflow steps such as compression, sampling, and storage of the video communication content. More specifically, and in certain embodiments, a risk scale value can be assigned to video communications based on various metadata elements extracted from and/or associated with the video, and use the risk scale value to select the appropriate processing steps. The processing steps may include, for example, applying varying levels of storage and retention specifications to the video, as well as using different digital compression and encryption algorithms on the video based on the content and risk scale.

The invention also addresses the need for storage efficiency, data protection, and cost reduction in long term storage of electronic video content that may be subject to regulatory compliance. The video communication files are encoded based on the content of the video, the content categories, and potential risks therein when compared to regulatory and corporate compliance needs. Given a video communication file or stream by an organization, the method and computer program dynamically encodes—that is, compresses and/or encrypts the video, video content, and related metadata—with different levels of encryption, compression, or both based on a pre-defined encoding policy and the video communication content.

Therefore, in a first aspect, a method for processing video communications includes receiving at least a portion of a video communication, and accessing, by one or more processors from a stored memory, a set of communication policies. Content is extracted from the video communication by the processors, which also classify the video communication according to the policies based on the extracted content. The video communication is processed according to a set of workflow based on the classification.

The extracted content may be audio content, video content, and/or images. For extracted spoken audio content, the processors may convert some or all of the spoken audio content into a textual representation of the audio content, including phonemes, words and/or graphemes. The spoken audio content may be compared to a library of known audio content and, based at least in part on the comparison, metadata can be assigned to the video communications. The metadata may be, for example, a name of a person and/or a function associated with at least one of the known audio content, and in some cases may also include a timestamp, a location a duration, an application source, a format and/or a resolution.

In some embodiments, the extracted content includes one or more images. The images can be compared to a library of known images and, based on the comparison, metadata, such as the name or function of a recognized individuals, can be assigned to the video communications associated with at least one of the known images.

In some embodiments, the set of communication policies includes instructions for a storage location of the video communication, a storage duration of the video communication, and/or a storage format (e.g., a compression format) of the video communication. In such instances, the processing of the video communications incudes compressing the video communication using the specified compression format and storing the video communications at the specified storage location.

In another aspect, the invention provides a system for processing video communications. The system includes one or more processors and a memory coupled with the processors, wherein the processor executes a plurality of modules stored as computer executable instructions. The modules include a classification engine for receiving at least a portion of a video communications, extracting content (e.g., spoken audio content, images, etc.) from the video communications, and classifying the video communications according to the extracted content. The modules also include a policy engine for comparing video communications policies to the classified video communications and determining as set of workflow processing steps to be applied to the video communications based on the results of the comparison.

In some embodiments, the system also includes a workflow user interface for presenting the set of workflow processing steps to a user. The modules may also include a data storage module for storing the video communications policies.

The extracted content may be audio content, video content, and/or images. For extracted spoken audio content, the processors may convert some or all of the spoken audio content into a textual representation of the audio content, including phonemes, words and/or graphemes. The spoken audio content may be compared to a library of known audio content and, based at least in part on the comparison, metadata can be assigned to the video communications. The metadata may be, for example, a name of a person and/or a function associated with at least one of the known audio content, and in some cases may also include a timestamp, a location a duration, an application source, a format and/or a resolution.

In some embodiments, the extracted content includes one or more images. The images can be compared to a library of known images and, based on the comparison, metadata, such as the name or function of a recognized individuals, can be assigned to the video communications associated with at least one of the known images.

In some embodiments, the set of communication policies includes instructions for a storage location of the video communication, a storage duration of the video communication, and/or a storage format (e.g., a compression format) of the video communication. In such instances, the processing of the video communications incudes compressing the video communication using the specified compression format and storing the video communications at the specified storage location.

In another aspect, the subject matter described in this specification relates to an article. The article includes a non-transitory computer-readable medium having instructions stored thereon that, when executed by one or more computer processors, cause the computer processors to perform operations including receiving at least a portion of a video communication, and accessing, by one or more processors from a stored memory, a set of communication policies. Content is extracted from the video communication by the processors, which also classify the video communication according to the policies based on the extracted content. The video communication is processed according to a set of workflow based on the classification.

SUMMARY OF THE FIGURES

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAIL DESCRIPTION

The disclosed invention provides systems, methods, and a computer program that processes video communication created by or viewed by organizations subject to internal and/or external regulations (e.g., financial services firms, healthcare organizations, governmental agencies, etc.). As such, the organizations must provide evidence of ongoing compliance with the regulations in all methods of communication, including video communication it or its employees and authorized agents initiated or created to communicate with its audiences, and the invention provides tools for detecting content, classifying the video, and applying workflow policies to the content and activity within such video communication.

The content may include voice, audio, text, still images of objects or people, graphics, chat transcripts, and/or file or document-based content exchanged among individuals or groups of people during a video communication session, and the processing includes the identification of individuals and objects or groups of participants using facial recognition and/or voice recognition, as well as the application of metadata identification. The video content may be content being broadcast and/or viewed within an organization, as well as broadcast to third parties viewing the video communication. For example, the communication may be initiated or sponsored by an organization or a member of an organization for the purpose of conducting business with consumers or other organizations. As used herein, video communication may include any video conferencing initiated and/or video content created by an organization to communicate internally with employees, externally with prospects, customers, partners, and other third parties. Such systems include video conferencing platforms and programs such as Cisco WebEx, GoToMeeting, Microsoft Skype for Business, Microsoft Teams, Google Hangouts, Skype, CafeX, Apple FaceTime, Zoom, and BlueJeans. Other video display mediums such as Videyard, Kaltura, Brightcove, Panopto, YouTube, Vimeo, Facebook, may also be used as sources for the video communication.

In addition, reviewers, participants, auditors, and regulators participating in or reviewing the video communication may be notified that certain actions or documents are out of compliance or score below some risk threshold or risk scale. For example, and auditor may be any individual or group that is tasked with reviewing video communication with the intent of examining its content to determine of the content and the treatment of the video communication (e.g., confidentiality, storage, retention policies, user access rights, etc.) is in compliance with the organizational rules and regulations.

In some cases, a computer-based visual user interface and workflow application facilitates management of the video communication compliance and archival process. The workflow application accesses and implements compliance guidelines and rules regarding the video communication based on its content, participants, risk scoring, or other metadata to apply the appropriate compression, storage and retention processes.

The approach described herein uses a multi-stage process that compares video content to pre-defined policy sets in order to determine a risk score, and recommend or apply actions related to alerts, compression, and/or storage. In summary, and referring to FIG. 1, the approach can be summarized as four operational stages. In a first step, data consumption and extraction (Step 104) video content is ingested into the system for analysis and processing and information and metadata relevant to the eventual treatment of the video is extracted. A policy analysis step (Step 108) applies rules to the metadata and classifies the video accordingly. Application of rules may include, for example, comparing metadata to one or more policy sets defined by external regulatory compliance, internal rules such as acceptable use policies, community-based regulations, or any combination thereof. Based on the application and analysis, a risk score is calculated—that is the video is deemed to be high-risk, low-risk or given some numerical score.

Figure 1:
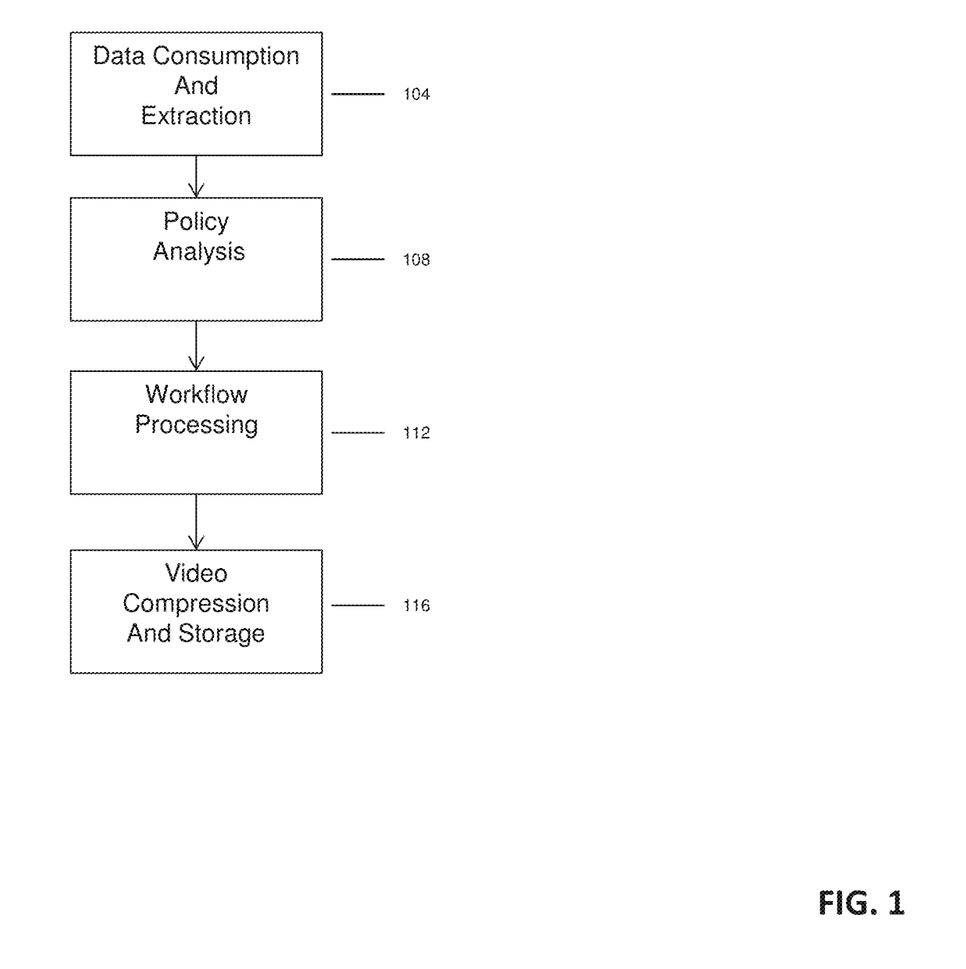
FIG. 1 is a flow chart illustrating, at a summary level, the steps for capturing and processing video communications in accordance with various embodiments of the invention.

A workflow processing step (Step 112) applies the appropriate workflow policies to the video based on the classification(s) applied to the video. In some embodiments, the workflow processing step 112 also provides an application user interface in which the processed videos and associated metadata is presented to users for search, review, and the addition or editing of comments. Additional video controls may be provided to the user for viewing and/or annotating the video. A video compression and storage step (Step 116) then implements the policy actions for the video by compressing the video, the video content, and metadata based on the policy analysis, risk score, workflow actions, and other user instructions and, for example, assigning a storage and retention policy to the video.

Figure 2A:
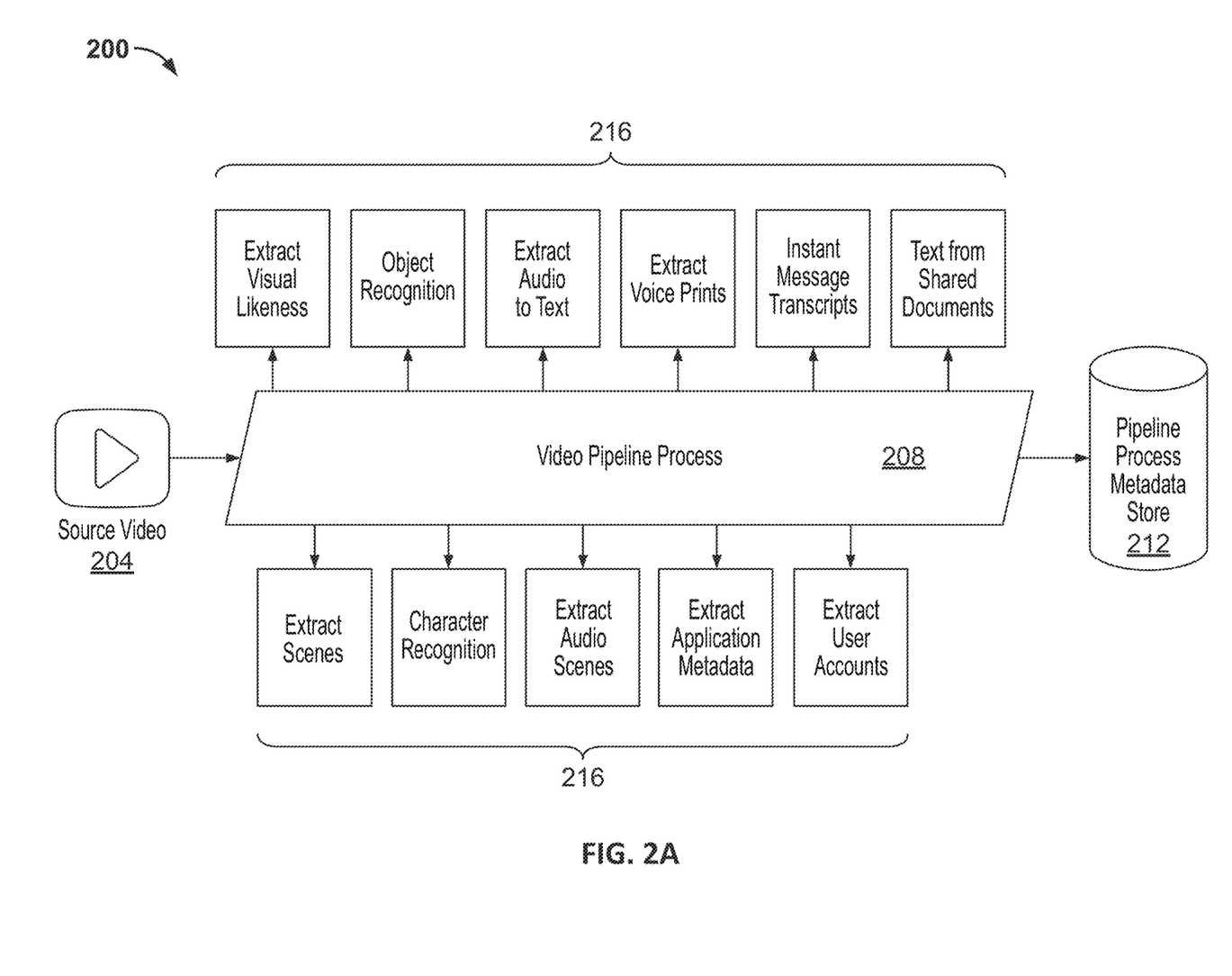
FIGS. 2A and 2B illustrate a processing environment and workflow in which various embodiments of the invention process video communications.

Referring to FIG. 2, a video communication processing system 200 implements the processes described herein. The system 200 access and receives source video content 204 using any number of conventional techniques used to place, move or copy a digital video file. For example, the video may be uploaded by the organization to the system through a user-based web-portal, access from another application through Application Program Interfaces (API), or through direct service links from video application services.

The video content 204 is then processed through a "pipeline" 208 during which any number of extraction scripts, programs, services, or other software captures useful content from the video 204. The extraction process may result in one or more still images, audio segments, text, application files (e.g., documents, spreadsheets, presentations, etc.), and application level metadata that is stored in a pipeline process metadata storage module 212.

The extraction processes (collectively 216) can include one or more processes for examining a source video by a computer program or programs, where information about the video ("metadata") can be captured, stored, and subject to additional analytics, such as correlation, machine learning, and pattern matching using facial recognition, voice recognition, voice-to-text, etc. As the video content 204 moves through the pipeline 208, the various applications, programs, scripts, or other services (216) are applied to the video 204 to identify and tag specific content type and extract application metadata and enhanced metadata from the content of the video communication for storage and subsequent use. At each processing step, the results (e.g., likenesses, images, scene changes, objects, associated metadata, etc.) are stored in the metadata store 212 for use in later correlation, search, and analysis.

Metadata, as used herein, describes any information captured or created that describes or categorizes the source video stream 204 that can be collected or generated through analysis and/or machine learning. More specifically, application metadata describes general information about the source video stream or file that can be collected with no or minimal additional analysis, such as Source IP address, source URL, file name, title, application type, video type, encoding, time and date stamp, duration, framerate, video resolution, file hash, copyright, embedded metadata (e.g. XML, XMP/RDF, MPEG-7), etc. Enhanced metadata is information about the source video stream or file which is extracted or learned through analysis, correlation, and machine learning, such as participant identities, scene changes, diarized transcripts, content topics, object identification, number of participants, types of content shared and communicated, etc.

In some implementations, the video processor pipeline sub-components 216 extract visual likeness(es) from the video to be used in facial recognition and/or face selection. In this step, the pipeline process presents the video to a facial recognition module, capturing participant likenesses, facial expressions, and similar information about the participants, compiling a collection of likenesses for each participant face shown in the video communication. From this collection, the process selects the best likeness for visual clarity of each participant. The video processor pipeline sub-components may also extract images from the video for object recognition and labeling. In this step, the pipeline process presents the video to an object recognition module, where the video images are evaluated against object libraries. Any identified matches can be labeled with the appropriate metadata, a timestamp and stored.

The video processor pipeline sub-components may extract scenes from the video for analysis. In this step, the pipeline process evaluates the video content from one moment to the next in order to identify if large visual changes have occurred.

In some cases, the processor pipeline sub-components may extract text from presented images via optical character recognition (OCR). In this step, the pipeline process hands the video off to an OCR process that identifies text within the video. If so, those frames are then copied to OCR functions, where the text is extracted from the image and stored. An audio-to-text process uses conventional audio-to-text tools to produce output as recorded, diarized transcripts to be stored in the pipeline process metadata store 212 for later use.

In some embodiments, an audio scene extraction process uses audio analysis tools to evaluate the video content 204 for large changes in the audio volume (e.g., audio silent frames vs. audio loud/noisy frames) from one moment to the next in order to identify audio scene changes. The resulting output is recorded as audio scene changes and timestamps in the pipeline processor metadata store 212.

For some implementations, voice recognition processing tools are used to identify individual participants within the video communication using voice biometrics and the resulting voiceprints are recorded as participant voice signatures and added to the enhanced metadata associated with the video communication for storage in the metadata store 212.

Application metadata may also be extracted from the video communication. In this process, a set of functions examines the video and captures network information (e.g., source and destination IP addresses) presentation information (e.g., video/audio encoding, time and date stamp, duration, framerate/bitrate, video resolution, etc.), and application-layer information (e.g. source URL, file name, title, application type, video type, file hash, copyright, embedded metadata (e.g. XML, XMP/RDF, MPEG-7). Other information such as number of participants, names of participants, types of content shared and communicated is also captured and recorded as application metadata in the pipeline processor metadata store 212.

Additional application metadata such as chat/instant messaging, comments and other informal participant communication may be extracted from the video content 204 by examining the video 204 to determine if related instant messaging content is associated with the video 204, such as by reviewing embedded as side-channel metadata or chat data explicitly provided by the participating individuals or entity. If, for example, instant messaging is being used during the video, it can be recorded as chat metadata and stored in the metadata store 212 with other application metadata.

Other participant-related data may also be extracted from the video 204. For example, user account information, screen names, email addresses, social media handles, as well as other individual identifiers may be identified in or associated with the video content 204, either embedded as side-channel metadata or explicitly provided by the individual participants or entity. In some instances, participants in the video may be asked to share email addresses, user IDs, social media names, or other information as a prerequisite to participating in the video and such metadata is then associated with the video in the metadata store 212.

Other processes may be used to extract text from shared documents presented in, shared or used within a video communication system (e.g., WebEx). In such cases, the video 204 is examined to determine if documents (.doc files, shared documents, Adobe PDF, spreadsheets, text, slides, etc.) associated with or presented as part of the video either embedded as side-channel metadata or explicitly provided by the participants. If documents exist, they may analyzed and recorded as document metadata and stored in the metadata store 212.

Note in this document, each extraction process in the processing pipeline 208 is described as operating serially and independently on the source video 204. This is done merely for clarity and comprehension, however video pipeline extraction process 208 may be performed in any sequence or in parallel. The specific sequence of processing video 204 through sub-components may be specified if particular technical dependencies require such sequencing. Not all steps in the processing pipeline 208 are necessary for extracting metadata in all cases, and may be skipped if not needed or of the processing expense is deemed too high. For example, some video communication may not have some elements (e.g., no participant video, no instant messaging, no shared files, etc.) so those extraction steps may be excluded. Once the video 204 is processed and metadata and enhanced metadata have been captured and stored in the metadata store 212, the video content 204 proceeds to the classification and policy analysis processes.

Figure 2B:
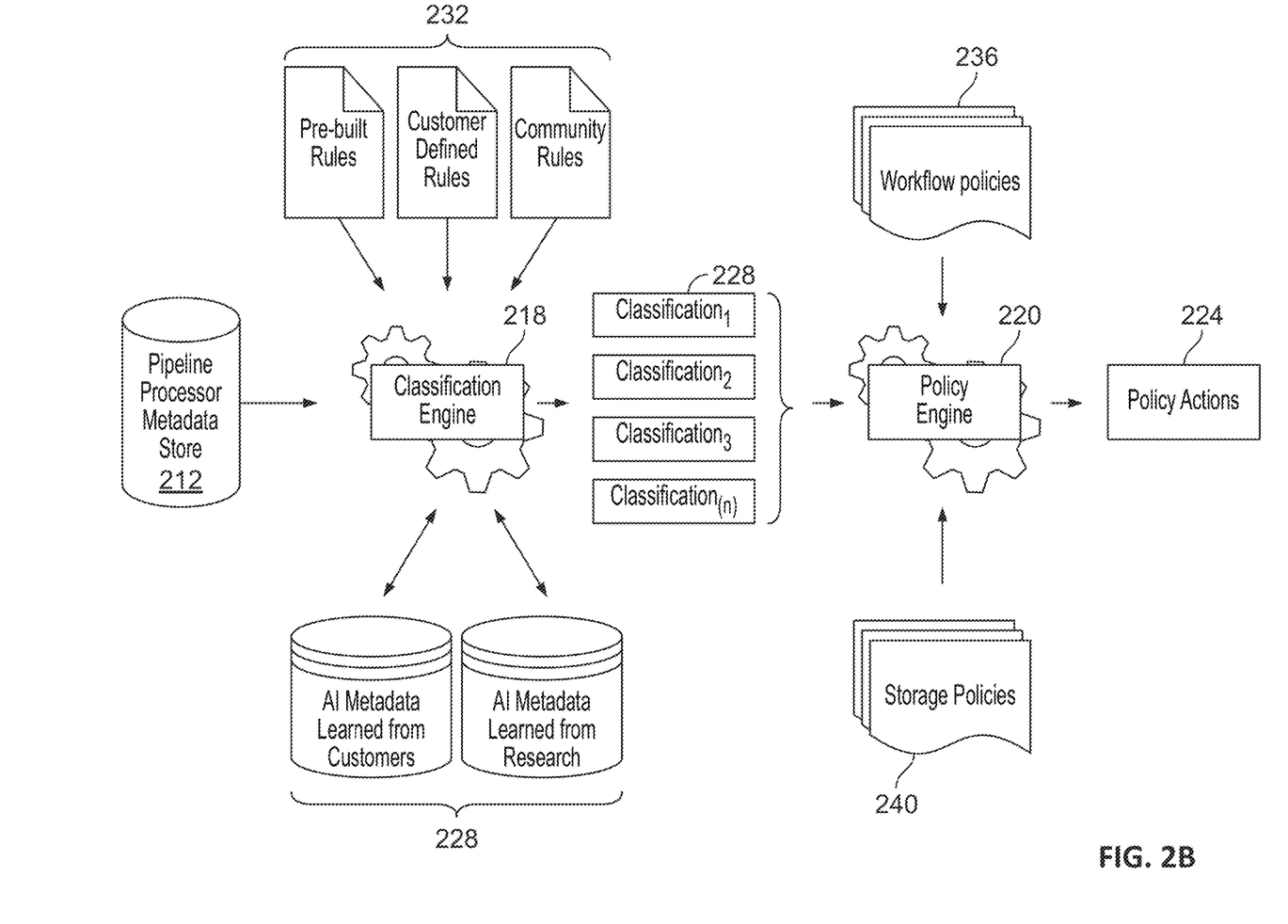

Referring to FIG. 2B, the stored metadata 212 is analyzed at a classification engine 218 to find data, correlate data, classify data, and provide a risk score to the data (or any variation thereof) of the video content based on a set of rules. When the correlation, classification, and risk scoring is complete, a policy engine 220 determines the proper policy actions 224 to be taking on the video 204 based on the metadata, video content, regulations, and organization policies. More specifically, the classification engine 218 compares the stored metadata information 212 to a collection of rules 232 derived from various sources in order to classify and score the video content 204.

The classification rules 232 can include various search parameters such as static rules (e.g., keyword searches, phrase searches, Boolean logic, wildcard searches, or regular expression parameters) and dynamic rules (e.g., rule feeds, internal or external applied machine learning). The rules may be created by program developers, end-users, or a community of users. In some cases, machine learning and other data analytics processes may be applied to aggregated data provided by users or external research data to create a set of implied rules 228. Each set of rules may be applied to the metadata to calculate a risk score and resulting in sets of classified video content 228, each set being subject to one or more policies, as described below. For example, The output of the content analysis is an assessment of the video content, presented along with the video, as measurement(s) of risk, in alphanumeric or graphical form that may be read by a computer program, variously described as classifications, profiles, scores, scales, weights, heat map, evaluations, or others singular or plural—hereafter a: "Content Risk Profile" of the video.

For example, the content analysis processes may determine that the video communication includes personally identifiable information and discussions of the sale of securities, therefore the video content is categorized both "personal privacy" and "securities trading."

Once the video communications and content has been classified, the policy engine 232 subjects the video content to a user workflow that can include a ticketing system, event manager, and/or logging system where classifications or scores that are determined to be "high-risk" may be brought to the attention of a reviewer for remediation based on various workflow policies 236. Additionally, the policy engine 232 may assign storage and compression policies 240 to the video based on the classification, risk score, or workflow so that the video may be stored in a manner appropriate to its content. Note that the example separates the classification engine 218 and policy engine 220 for visual clarity. Various implementations of the invention may not need to make this distinction. For example, an implementation may use a single process "engine" to do one or more of the functions: e.g. find, correlate, classify, score, process against a workflow, or assign storage policies.

Figure 3:
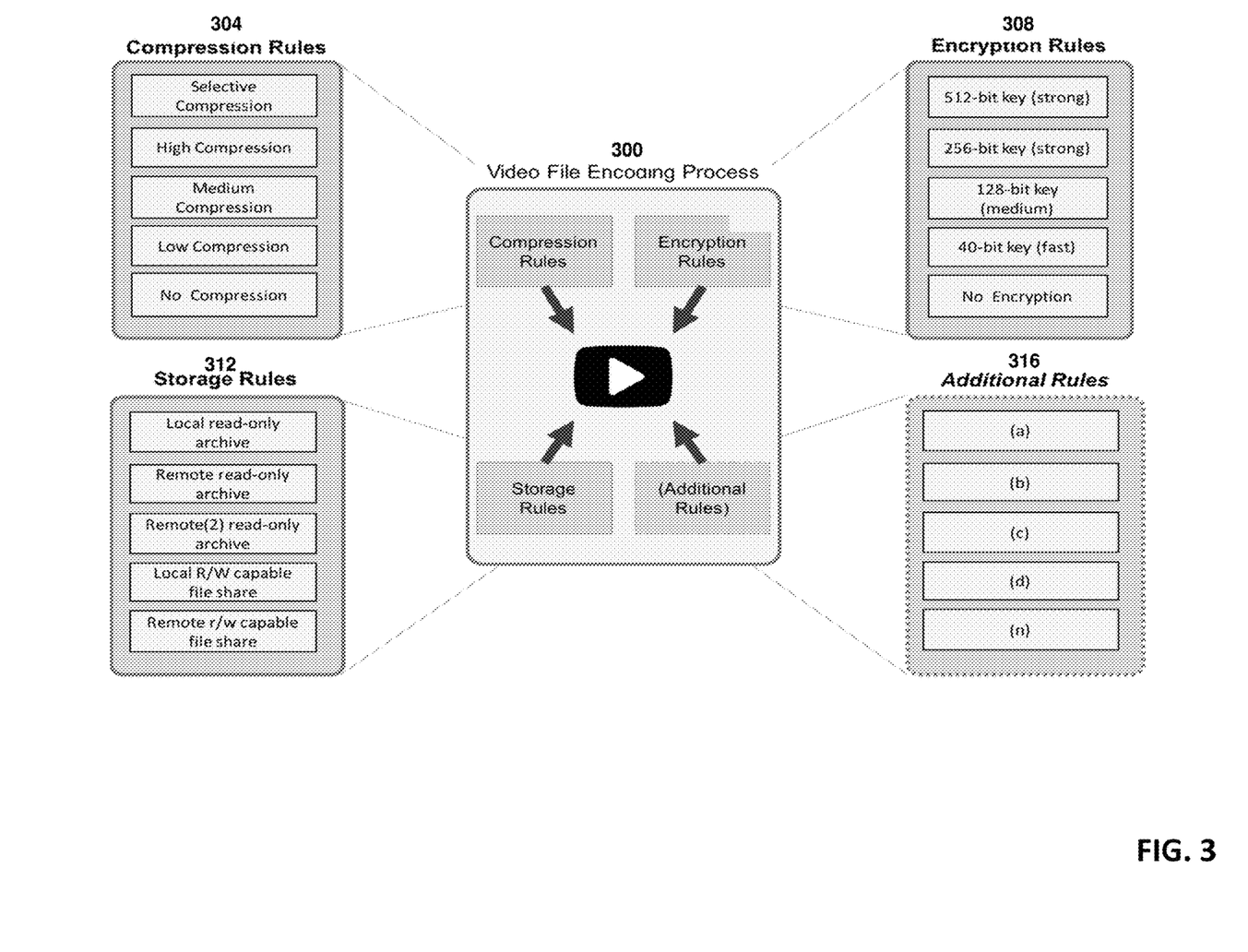
FIG. 3 illustrates a video encoding rule processing environment that applies various rules to video communications in accordance with various embodiments of the invention.

Referring to FIG. 3, compression, encryption and storage policies are implemented against the video communication using various processes 300 stored as pre-defined sets of rules that describe various encryption, compression and storage behaviors to apply to the video files being processed. The rules may include, for example, various compression rules 304 that range from selective compression or high compression for less sensitive communications, to low or no compression for information-dense, high importance communication. Encryption rules 308 may specify certain encryption algorithms to be applied such that information containing credit card data or other data subject to specific encryption rules use at least 128-bit key encryption, whereas other information may be stored without encryption. Storage rules 312 may be used to determine access policies to be applied to the video (read only, read/write, etc.) as well as duration.

The encoding policies may include rules based on external regulations, internal corporate policies, and/or auditor workflow actions. Examples of external regulations include international, national, local, industry, and/or community rules that define how electronic content is to be stored, for how long, and in which acceptable formats. For example, an encoding policy may include a rule such that any video file with a content category of "securities trading" is subject to FINRA encoding requirements (e.g., required to be stored for some minimum number of years in a WORM-compliant storage medium). Additionally, if a video file includes content related to protected health information (PHI), the video file is subject to HIPAA rules regarding privacy and security of the electronic communication.

Internal policies are sets of rules that represent how an organization stores data, usually in addition to what is required by external regulations. Internal policies may be influenced by a desire to protect intellectual property, guard corporate reputation, assure individual privacy, enforce acceptable use policies, optimize storage and/or operational costs, etc. For example, an organization following best practices in the art of data protection, may encode archived data (video files) with an additional level of encryption to assure the data files are unreadable in the event of data theft or exposure. Auditor workflow actions are decisions made by auditors (individually or collectively) to move or change the compression policy of video files. For example, if an auditor opens a case on a video while under review, it can be assumed that something in the video communication content has raised their suspicion or concern about the content within the video, thereby increasing its risk profile, and the resulting encoding policy results for the video. Alternatively, if a video is presented to an auditor for review that may have previously been marked "high-risk" the auditor may through workflow actions decrease its risk profile if the high-risk score was determined to be unwarranted.

During the encoding process, the video's classification(s), risk score, and auditor workflow actions are used to determine and recommend the appropriate compression to apply to the source video file. The encoding engine may recommend a specific set of encodings for a particular video file, or alternatively may be a form of a scoring process which assigns it to an encoding process class. Continuing the example from above, the video is known to contain personally identifiable information and securities trading information. Therefore, the video matches (at least) two encoding policies: PII and Financial Securities Trading, which may include HIPAA, GDPR, and FINRA rules. This particular video is therefore assigned to an encoding process that uses (i) low or loss-less compression due to FINRA requirements, and (ii) must be encrypted because of GDPR and HIPAA requirements. Once a compression policy 304 is selected for a video file, the file is ready for compression action.

Similar analysis may be used to select and apply an encryption rule 308. Such rules may be used to specify an encryption algorithm (e.g., 3-DES, RSA, AES, etc.) and key length (e.g., 80-, 112-, 128-, 256-, 512-, 1024-, or 2048-bit keys) used to encrypt the video communication prior to storage.

Storage rules 312 may also be applied to the video file. The storage rules may specify, for example, the network and/or physical location or storage media type where the file is to be stored (e.g., on premise tape backup, on premise network attached storage archive, cloud service block storage, cloud service offline storage, etc.). The storage rules 312 may also describe the storage lifecycle, that is how long the file is to be stored in its current state before re-evaluation, specific dates ("milestones") or frequency for when the file will be re-analyzed, and when the current policies may need to be updated or changed in response to possible changes in regulations. The storage rules 312 may also specify when the file has reached the end of its usefulness, and the steps necessary to remove or delete the file. Additional user or context specific rules 316 may be created by users of the system if additional policies are to be applied against the video communication.

Figure 4A:
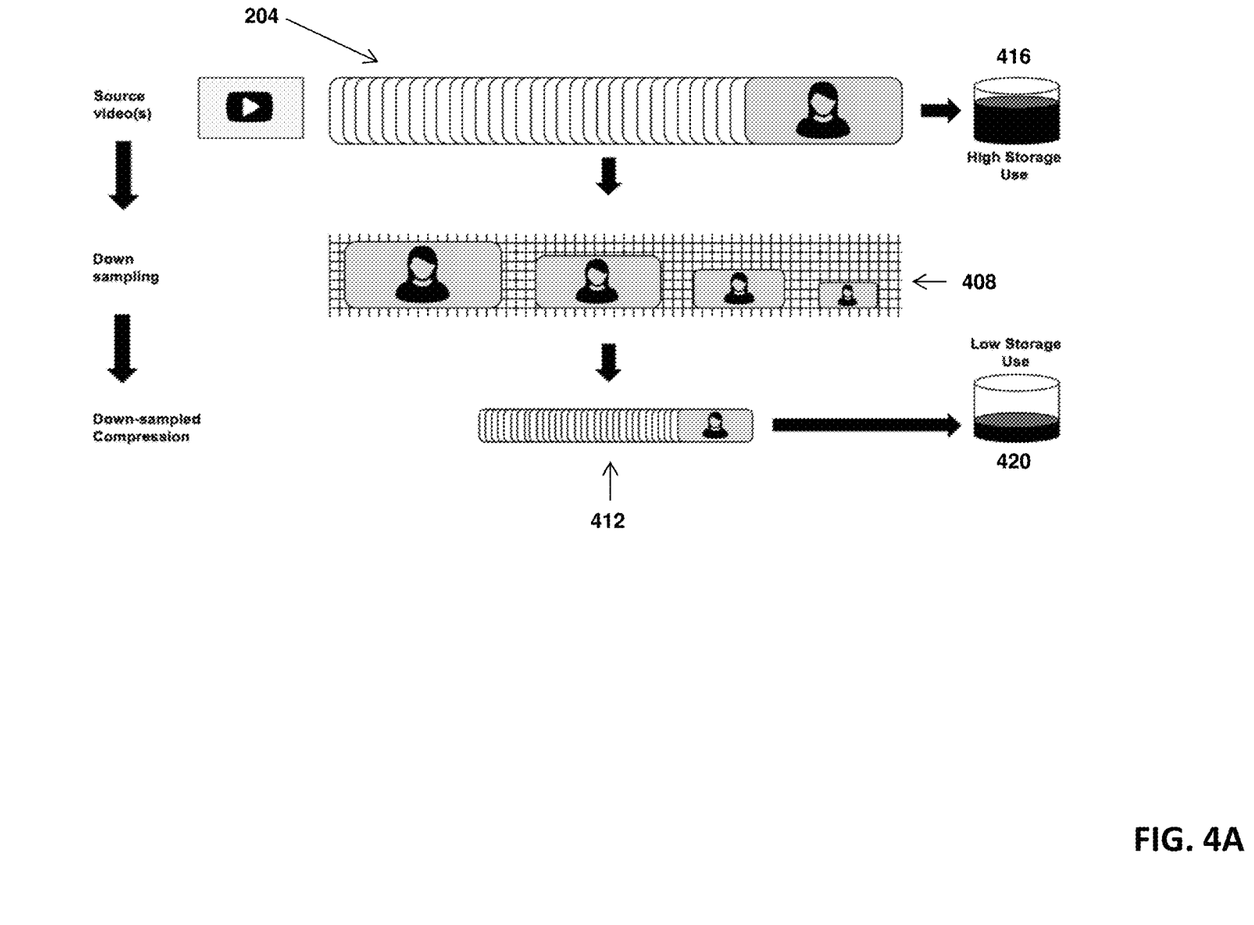
FIGS. 4A and 4B illustrate down-sampling and scene selection processes used in the application of various rules for processing video communications in accordance with various embodiments of the invention.
Figure 4B:
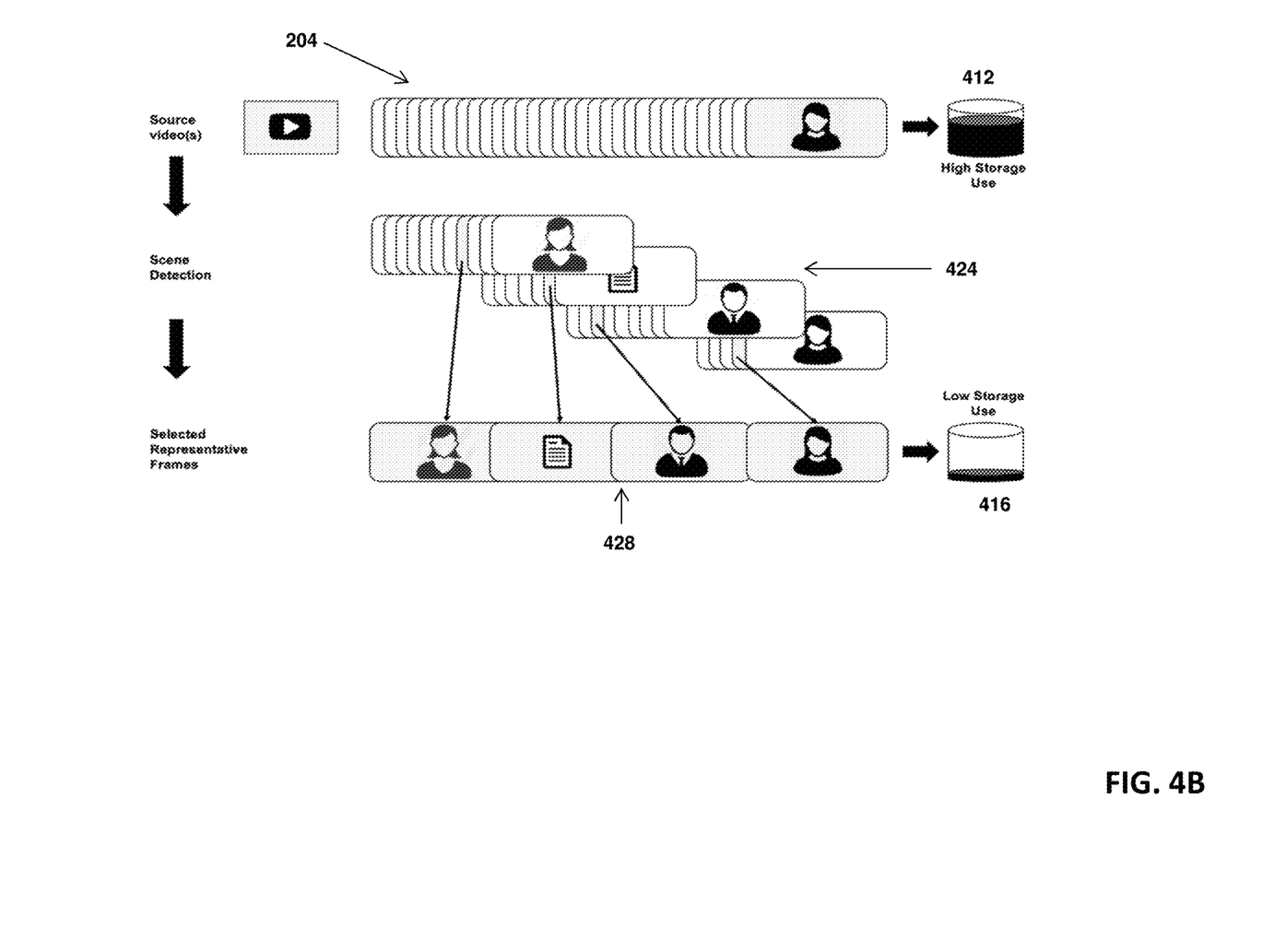

Referring to FIGS. 4A and 4B, certain embodiments may use selective content compression and/or frame selection techniques. For example, in some cases a video frame down-sampling/downscaling process 408 may be used such that the source video file 204 is transcoded from a high resolution to a lower resolution (e.g., from 4K to 1040p, to 640p, to 320p, etc.), or the video file framerate is transcoded from a high framerate to a lower framerate (e.g., 60 fps to 50 fps), or any combination, resulting in a "smaller" file 412. In some instances, the full file may be stored in one location (e.g., a high-storage use storage medium 416) and the down-sampled version at an alternative low storage medium 420.

In other embodiments, a process 424 of selecting certain important frames may be used to analyze the video stream and group consecutive similar frames into multiple "scenes" within the video stream (e.g., each time a new participant joins the video stream, each time a new graphic appears in the video, etc.). As a result, a selectively filtered video file 428 may include a subset of representational video frames or images from each scene to represent the content of that scene, then discard the remaining frames. The frame selection process may be used in conjunction with or instead of the video compression methods described above (e.g., MPEG-2, MPEG-4, H.264, etc.), as the frame selection process discards unused frames and frame transition data, and retains images selected by content analysis. Other techniques such as participant likeness and/or intelligent cropping may be used to identify participant facial images within the video stream, selecting representational images of each participant, and retaining those images, then retain the images, or identifying important images within the image frame(s) and cropping unused or unimportant image information from the frames to reduce image sizes.

Figure 5:
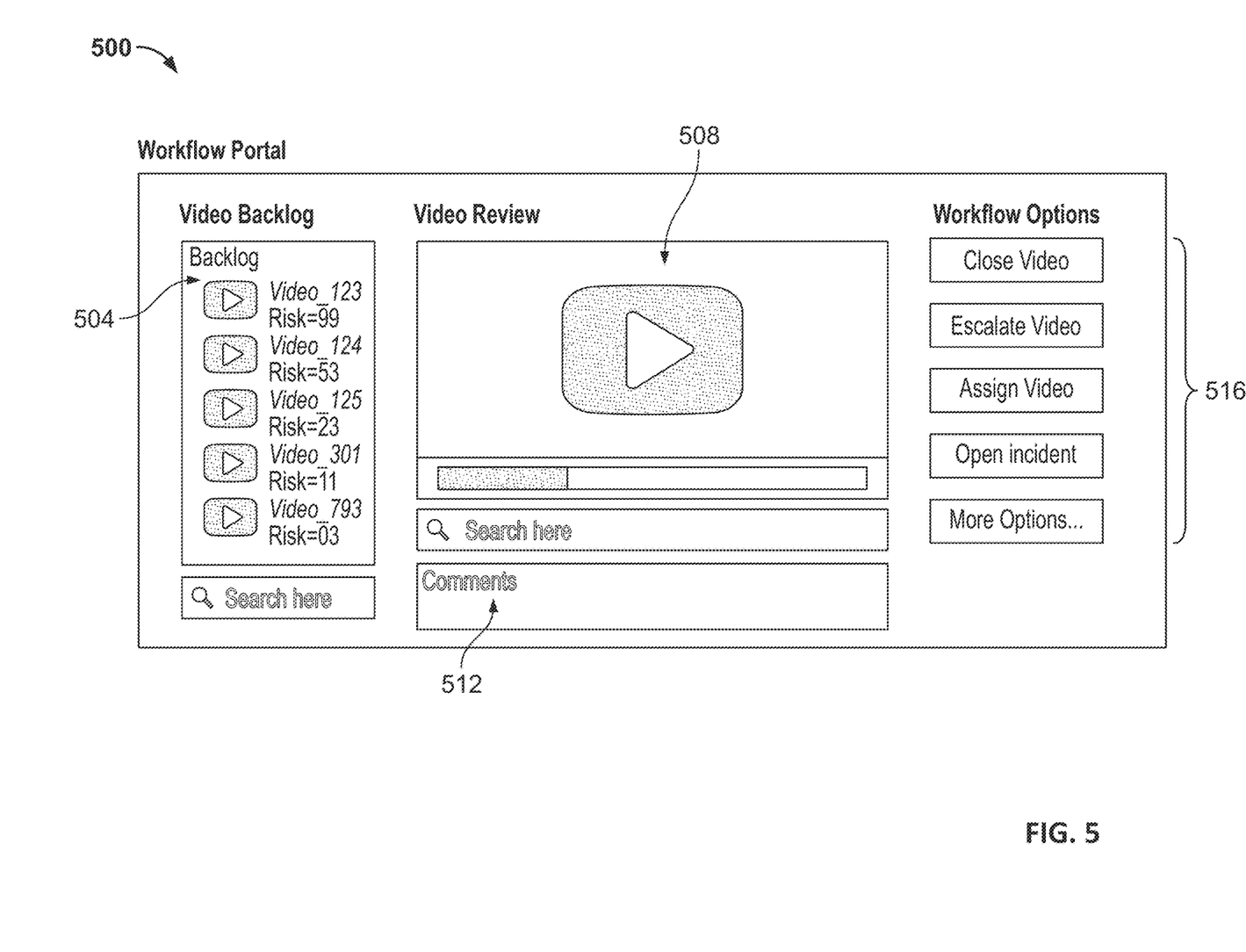
FIG. 5 is a screen capture of a workflow user interface within which users can track and manage a workflow process as applied to video communications, in accordance with various embodiments of the invention.

Referring now to FIG. 5, a workflow presentation interface 500 may take the form of any computer-based visual tool or API, such as a web based portal (HTML or others), mobile device app, computer-based application, etc. In one embodiment, the workflow interface 500 provides the user with a list 504 of videos that are assigned to them for review. In some cases, the videos 504 may be sorted by risk score. A comments and search box 512 facilitates the annotation and searching of the aggregate video metadata to find videos that contain content matching search criteria. The interface 500 may also include a player 508 (either as a native function or plug-in) to select and play a video for review. The interface 500 may also include a set of workflow control options 516 to move the video out of the reviewer's queue, identify a video as closed or processed, escalated, or other statuses.

Figure 7:
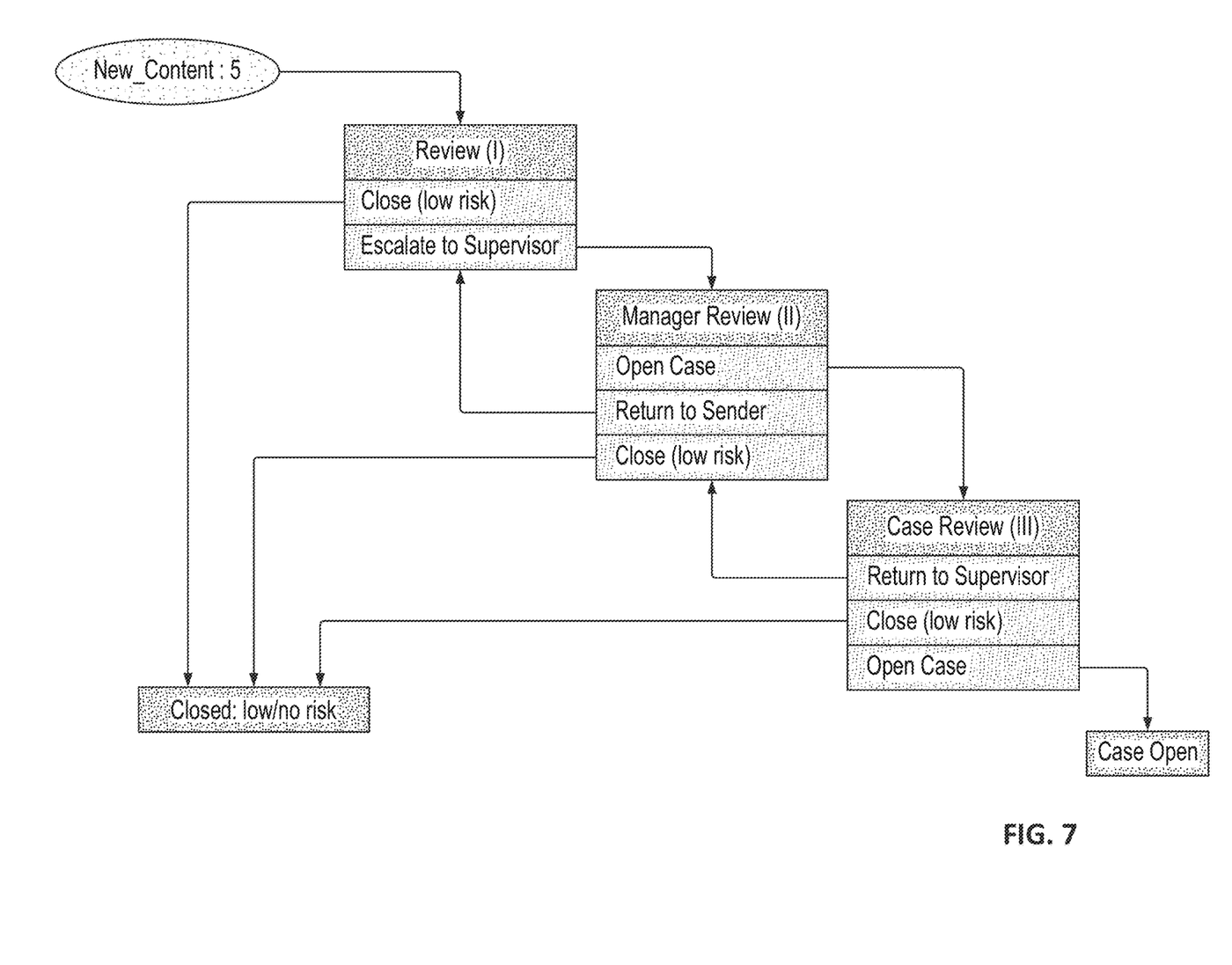
FIG. 7 is an exemplary workflow diagram illustrating a process for managing video communications in accordance with various embodiments of the invention.

In some cases, and referring to FIG. 7, the user may use the workflow process to alter video risk scores—for example, if the user closes the review in the workflow "without incident" based on a determination that no sensitive information was discussed or divulged in the video, the video's risk score(s) may be reduced. Alternatively, a user may create an "incident" on a video in the workflow based on previously unidentified actions, thus increasing the video's risk score(s).

Once a video (or set of videos) have been processed and classified, the selected compression and storage options are applied to the processed video and associated metadata. Compression decisions may be determined by pre-configured policies (predefined or custom) that determine the best or most appropriate video compression technologies and ratio based on any number of attributes of the processed video file, including its risk score, content classifications, metadata, source file size, video age vs. storage requirements, digital media storage costs, and more.

Compression algorithms may be selected from one or more compression technologies such as no compression, lossless compression, lossy compression, reduction of video resolution and/or color depth, removal of empty content, removal of "unimportant content" (e.g., keep images, transcripts, and metadata only), dynamic compression (e.g., compress portions that are uninteresting, but interesting portions are lightly compressed) or any combinations of the previous.

Storage decisions are also determined by policies (predefined or custom) that determine the best storage options based on any combination of the attributes in the processed video file, such as its risk score, metadata, participants, reviewer, workflow actions, source file size, video age, digital media storage costs, and more. Storage options are assigned by policy, and related to the options available to the program and the customer network computing environment and compliance regulations. For example, customer may have to store the processed video file and related metadata in WORM (Write Once Read Many)-compliant storage media, store videos with high-risk scores in an environment that provides cryptographically secure chain of custody, or provide for multiple copies to assure redundancy and availability for future audit. Additionally, the policy may provide a method to move files to different storage media at different milestones in the lifecycle of the video (that is, move from active high available storage to cold-archive as the video file ages). The compression and storage policies may be used in concert to dynamically change video storage by risk score, content classification, participant, workflow actions, or at milestones over the lifecycle of the video, such as increasing compression with file age, while simultaneously moving the file into more slow/offline digital archives.

It is understood that the methods and systems described above may contain software and hardware connected to the Internet via a network. Computing devices are capable of communicating with each other via the Internet, and it should be appreciated that the various functionalities of the components may be implemented on any number of devices.

Figure 6:
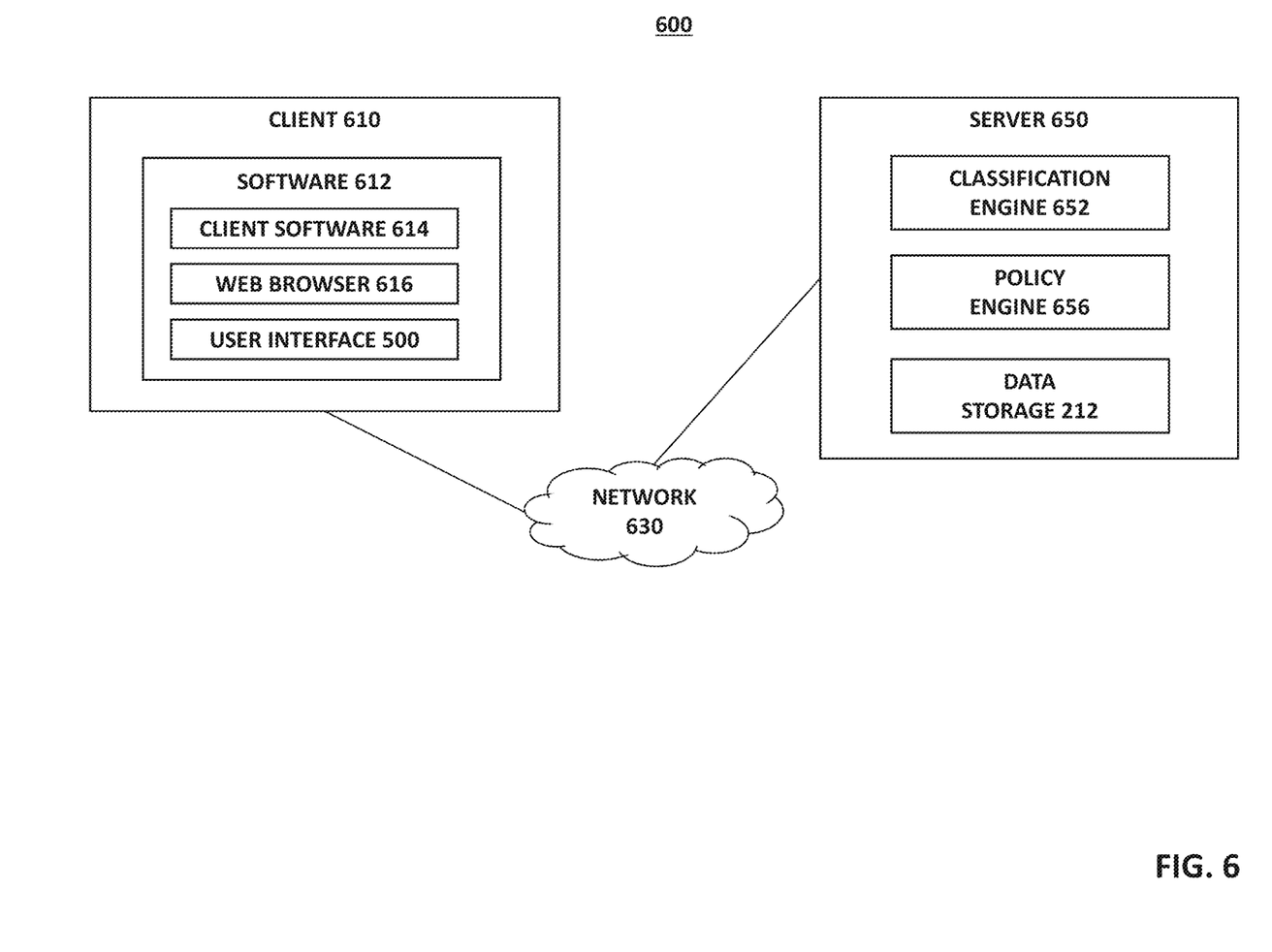
FIG. 6 is an architectural diagram depicting an exemplary system for implementing various embodiments of the invention.

Referring to FIG. 6, in some embodiments, the video communication processing, classification and storage system 600 (e.g., an embodiment of system 200) includes at least one client computer 610 and at least one server 650. The illustrative configuration is only for exemplary purposes, and it is intended that there can be any number of clients 610 and/or servers 650.

In some embodiments, the video communication processing, classification and storage system 600 may perform one or more (e.g., all) steps of methods described herein and outlined in FIGS. 1-3. In some embodiments, client 610 may implement user interface 300, and the classification engine 852 and policy engine 556 of server 550 may implement other components of the video communication processing, classification and storage system 200. However, embodiments are not limited by the manner in which the components of the video communication processing, classification and storage system 200 are distributed between client 510 and server 550. Furthermore, in some embodiments, all components of the video communication processing, classification and storage system 200 may be implemented on a single computer (instead of being distributed between client 610 and server 650, or implemented on two computers (e.g., client 610 and server 650).

One or more communications networks 630 connect the client 610 with the server 650. The communication may take place via any media such as standard telephone lines, LAN or WAN links (e.g., T1, T3, 56 kb, X.25), broadband connections (ISDN, Frame Relay, ATM), and/or wireless links (IEEE 802.11, Bluetooth). Preferably, the networks 630 can carry TCP/IP protocol communications, and data (e.g., HTTP/HTTPS requests, etc.) transmitted by client 610 and server 650 can be communicated over such TCP/IP networks. The type of network is not a limitation, however, and any suitable network may be used. Non-limiting examples of networks that can serve as or be part of the communications networks 830/880 include a wireless or wired Ethernet-based intranet, a local or wide-area network (LAN or WAN), and/or the global communications network known as the Internet, which may accommodate many different communications media and protocols.

The client 610 is preferably implemented with software 612 running on hardware. In some embodiments, the hardware may include a personal computer (e.g., a PC with an INTEL processor or an APPLE MACINTOSH) capable of running such operating systems as the MICROSOFT WIN- DOWS family of operating systems from Microsoft Corporation of Redmond, Wash., the MACINTOSH operating system from Apple Computer of Cupertino, Calif., and/or various varieties of Unix, such as SUN SOLARIS from SUN MICROSYSTEMS, and GNU/Linux from RED HAT, INC. of Durham, N.C. The client 810 may also be implemented on such hardware as a smart or dumb terminal, network computer, wireless device, wireless telephone, information appliance, workstation, minicomputer, mainframe computer, personal data assistant, tablet, smart phone, or other computing device that is operated as a general purpose computer, or a special purpose hardware device used solely for serving as a client 610.

Generally, in some embodiments, clients 610 can be operated and used for various activities including sending and receiving messages, requesting and viewing content available over the World Wide Web, participating in chat rooms, or performing other tasks commonly done using a computer, handheld device, or cellular telephone. Clients 610 can also be operated by users on behalf of others, such as employers, who provide client devices 610 to the users as part of their employment.

In various embodiments, the software 612 of client computer 610 includes client software 614 and/or a web browser 616. The web browser 614 allows the client 610 to request a web page or other downloadable program, applet, or document (e.g., from the server 650) with a web-page request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software 616 are INTERNET EXPLORER, offered by Microsoft Corporation, NETSCAPE NAVIGATOR, offered by AOL/Time Warner, FIREFOX offered the Mozilla Foundation, or CHROME offered by Google. In some embodiments, web browser software 616 and/or client software 614 may allow the client to access the user interfaces described above for the video communication processing, classification and storage system 200.

The server 650 interacts with the client 610. The server 650 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein may also be used, depending on the capacity of the device and the size of the user base. For example, the server 650 may be or may be part of a logical group of one or more servers such as a server farm or server network. As another example, there may be multiple servers 650 associated with or connected to each other, or multiple servers may operate independently, but with shared data. In a further embodiment and as is typical in large-scale systems, application software can be implemented in components, with different components running on different server computers, on the same server, or some combination.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, video processing techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

The invention claimed is:

1. A method performed by one or more processors for processing video communication, the method comprising:
  receiving at least a portion of a video communication;
  accessing a set of communication policies;
  extracting content from the portion of the video communication;
  processing the extracted content using facial recognition, optical character recognition, and scene change detection;
  assigning a risk score to the portion of the video communication according to the set of communication policies and the processed content, wherein the risk score is based on a regulatory risk, privacy risk, security of electronic communication, risk of trade secret protection loss, and corporate policy compliance risk;
  receiving, from a user, a confirmation that the assigned risk score is correct or a new risk score;
  selecting a level of compression, a level of encryption, a storage location, and a storage duration based on the assigned risk score or the new risk score; and
  compressing the portion of the video communication using the selected level of compression, encrypting the portion of the video communication using the selected level of encryption, and storing the portion of the video communication in the selected storage location for the selected storage duration.

2. The method of claim 1, wherein the extracted content comprises spoken audio content.

3. The method of claim 2, further comprising converting at least a subset of the spoken audio content into a textual representation of the audio content.

4. The method of claim 3, wherein the textual representation of the audio content comprises one or more of phonemes, words and graphemes.

5. The method of claim 2, further comprising comparing the spoken audio content to a library of known audio content and, based at least in part on the comparison, assigning metadata to the portion of the video communication, the metadata comprising a characteristic of a person associated with at least one of the known audio content.

6. The method of claim 5, wherein the characteristic of the person comprises one or more of a name and a function.

7. The method of claim 6, wherein the metadata further comprises one or more of a timestamp, a location, a duration, an application source, a format, and a resolution.

8. The method of claim 1, wherein the extracted content comprises text extracted from documents shared among participants in the portion of the video communication.

9. The method of claim 1, wherein the extracted content comprises one or more images.

10. The method of claim 9, further comprising comparing the one or more images to a library of known images and, based at least in part on the comparison, assigning metadata to the portion of the video communication associated with at least one of the known images.

11. The method of claim 10, wherein the metadata comprises a characteristic of a person associated with at least one of the known images, the characteristic of the person comprising one or more of a name and a function.

12. The method of claim 1, wherein compressing the portion of video communication comprises removing unimportant content or empty content from the portion of the video communication.

13. A system for processing video communication, the system comprising:
  one or more processors; and
  a memory coupled with the one or more processors, wherein the processor executes a plurality of modules stored as computer executable instructions in the memory, and wherein the modules comprise:
    a classification engine for (i) receiving at least a portion of a video communication, (ii) accessing a set of communication policies, (iii) extracting content from the portion of the video communication, (iv) processing the extracted content using facial recognition, optical character recognition, and scene change detection, (v) assigning a risk score to the portion of the video communication according to the set of communication policies and the processed content, wherein the risk score is based on a regulatory risk, privacy risk, security of electronic communication, risk of trade secret protection loss, and corporate policy compliance risk, and (vi) receiving, from a user, a confirmation that the assigned risk score is correct or a new risk score; and
    a policy engine for (i) selecting a level of compression, a level of encryption, a storage location, and a storage duration based on the assigned risk score or the new risk score, and (ii) compressing the portion of the video communication using the selected level of compression, encrypting the portion of the video communication using the selected level of encryption, and storing the portion of the video communication in the selected storage location for the selected storage duration.

14. The system of claim 13, further comprising a workflow user interface for presenting the one or more workflow processing steps to a user.

15. The system of claim 13, further comprising a data storage module for storing the video communication policies.

16. The system of claim 13, wherein the extracted content comprises spoken audio content.

17. The system of claim 16, further comprising, by the one or more processors, converting at least a subset of the spoken audio content into a textual representation of the audio content.

18. The system of claim 17, wherein the textual representation of the audio content comprises one or more of phonemes, words and graphemes.

19. The system of claim 16, further comprising, by the one or more processors, comparing the spoken audio content to a library of known audio content and, based at least in part on the comparison, assigning metadata to the portion of the video communication, the metadata comprising a characteristic of a person associated with at least one of the known images.

20. The system of claim 19, wherein the characteristic comprises one or more of a name and a function.

21. The system of claim 20, wherein the metadata further comprises one or more of a timestamp, a location, a duration, an application source, a format, and a resolution.

22. The system of claim 13, wherein the extracted content comprises one or more images.

23. The system of claim 22, further comprising, by the one or more processors, comparing the one or more images to a library of known images and, based at least in part on the comparison, assigning metadata to the portion of the video communication associated with at least one of the known images.

24. The system of claim 23, wherein the metadata comprises a characteristic of a person associated with at least one of the known images, the characteristic of the person comprising one or more of a name and a function.

25. The system of claim 13, wherein compressing the portion of video communication comprises removing unimportant content or empty content from the portion of the video communication.

26. A non-transitory computer-readable medium having instructions stored thereon that, when executed by one or more computer processors on a server, cause the computer processors to:
  receive at least a portion of a video communication;
  access a set of communication policies;
  extract content from the portion of the video communication;
  process the extracted content using facial recognition, optical character recognition, and scene change detection;
  assign a risk score to the video communication according to the policies and the processed content, wherein the risk score is based on a regulatory risk, privacy risk, security of electronic communication, risk of trade secret protection loss, and corporate policy compliance risk;
  receive, from a user, a confirmation that the assigned risk score is correct or a new risk score;
  select a level of compression, a level of encryption, a storage location, and a storage duration based on the assigned risk score or the new risk score; and
  compress the portion of the video communication using the selected level of compression, encrypt the portion of the video communication using the selected level of encryption, and store the portion of the video communication in the selected storage location for the selected storage duration.

* * * * *